(12) United States Patent
Guo et al.

(10) Patent No.: US 6,888,694 B2
(45) Date of Patent: May 3, 2005

(54) ACTIVE CONTROL SYSTEM AND METHOD FOR REDUCING DISK FLUTTERING INDUCED TRACK MISREGISTRATIONS

(75) Inventors: Guoxiao Guo, Singapore (SG); Jingliang Zhang, Singapore (SG); Zhimin He, Singapore (SG); Eng Hong Ong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 266 days.

(21) Appl. No.: 10/162,507

(22) Filed: Jun. 4, 2002

(65) Prior Publication Data

US 2003/0133218 A1 Jul. 17, 2003

(30) Foreign Application Priority Data

Jan. 15, 2002 (SG) ............................ 200200276

(51) Int. Cl.[7] .............................. G11B 5/596
(52) U.S. Cl. ................................... 360/77.03
(58) Field of Search ........................ 360/75, 77.03, 360/234.4, 234.7, 264.2, 265.9, 294.7, 244.1, 245.8, 245.9

(56) References Cited

U.S. PATENT DOCUMENTS

| | | | |
|---|---|---|---|
| 3,863,124 A | * | 1/1975 | Pierce et al. ......... 360/294.7 X |
| 4,136,364 A | | 1/1979 | Beery et al. |
| 4,258,398 A | | 3/1981 | Bixby et al. |

(Continued)

FOREIGN PATENT DOCUMENTS

| | | |
|---|---|---|
| EP | 895 225 | 2/1999 |
| JP | 04271072 A | * 9/1992 |

OTHER PUBLICATIONS

Alexei H. Sacks, Marc Bodson and William Messner, Advanced Methods for Repeatable Runout Compensation, Mar., 1995, IEEE Transactions on Magnetics, vol. 31, No. 2.

Jingliang Zhang, Ruifeng Chen, Guoxiao Guo, and Teck–Seng Low, Modified Adaptive Feedforward Runout Compensation for Dual–Stage Servo System, Sep., 2000, IEEE Transactions On Magnetics, vol. 36, No. 5.

Rich Ehrlich and Dick Curran, Major HDD TMR Sources and Projected Scaling with TPI, Mar., 1999, IEEE Transactions on Magnetics, vol. 35, No. 2.

Yuhong Huang, Michael Banther, Priyadarshee D, Mathur and William C. Messner, Design and Analysis of a High Bandwidth Disk Drive Servo System Using an Instrumented Suspension, Jun., 1999, IEEE/ASME Transactions on Mechatronics, vol. 4, No. 2.

*Primary Examiner*—Sinh Tran
*Assistant Examiner*—James L Habermehl
(74) *Attorney, Agent, or Firm*—Renner, Otto, Boisselle & Sklar, LLP (57) ABSTRACT

The present invention relates to controlling an actuator for positioning a read/write head in storage devices such as disk drives. More specifically, the invention relates to using a sensor to detect the disk vibration amplitude perpendicular to the disk surface, and using feed forward control to cancel or counteract the tendency of the read/write head to deviate off-track due to disk vibration. Various approaches are proposed to detect the disk vertical vibration.

20 Claims, 5 Drawing Sheets

U.S. PATENT DOCUMENTS

| | | | | |
|---|---|---|---|---|
| 4,424,368 A | | 1/1984 | Swartz et al. | |
| 5,031,055 A | * | 7/1991 | Yanagisawa | 360/75 |
| 5,162,661 A | * | 11/1992 | Sato et al. | 250/559.38 |
| 5,377,058 A | * | 12/1994 | Good et al. | 360/75 |
| 5,526,208 A | | 6/1996 | Hatch et al. | 360/294.1 |
| 5,856,895 A | * | 1/1999 | Schaenzer et al. | 360/234.7 |
| 5,862,015 A | | 1/1999 | Evans et al. | 360/244.1 |
| 5,936,787 A | * | 8/1999 | Ohmi | 360/77.06 X |
| 6,064,540 A | | 5/2000 | Huang et al. | 360/75 |
| 6,097,559 A | | 8/2000 | Ottesen et al. | |
| 6,097,565 A | | 8/2000 | Sri-Jayantha et al. | 360/78.09 |
| 6,166,874 A | * | 12/2000 | Kim | 360/75 |
| 6,181,520 B1 | | 1/2001 | Fukuda | 360/244.1 |
| 6,185,171 B1 | * | 2/2001 | Bassett et al. | 360/78.09 X |
| 6,351,341 B1 | * | 2/2002 | Lee et al. | 360/75 |
| 6,381,088 B1 | * | 4/2002 | Despain et al. | 360/77.06 |
| 6,473,259 B1 | * | 10/2002 | Kuo et al. | 360/75 |
| 6,487,028 B1 | * | 11/2002 | Sri-Jayantha et al. | 360/77.04 X |
| 6,501,606 B2 | * | 12/2002 | Boutaghou et al. | 360/75 X |
| 6,501,625 B1 | * | 12/2002 | Boismier et al. | 360/294.7 |
| 6,568,289 B2 | * | 5/2003 | Nakajima | 73/865.8 |
| 6,570,730 B1 | * | 5/2003 | Lewis et al. | 360/75 |
| 6,590,748 B2 | * | 7/2003 | Murphy et al. | 360/294.4 |

* cited by examiner

ACTIVE CONTROL SYSTEM AND METHOD FOR REDUCING DISK FLUTTERING INDUCED TRACK MISREGISTRATIONS

FIELD OF THE INVENTION

The present invention relates to controlling head positioning actuators in storage devices such as disk drives via feed forward control, to reduce or counteract disk flutter induced off-track deviation of the read write head. More specifically, the invention relates to employing sensors to detect the magnetic disk vibration perpendicular to the disk surface, and using feed forward control to cancel or counteract the off-track deviation of the head caused by disk vibration. Various approaches for detecting the disk vertical vibration are proposed. A control system structure is also proposed.

BACKGROUND OF THE INVENTION

A typical magnetic disc drive (HDD) includes one or more read/write (R/W) heads for reading data from or writing data to one or more discs mounted on a spindle motor. The data is stored in generally concentric tracks on the disc surface. During operation of the drive, the read/write heads are positioned at selected radial locations while the discs are rotated by the spindle motor. Rotary actuators are often employed to carry the read/write heads to the desired locations. The actuator is usually coupled to a voice coil motor which provides the torque for rotating the actuator about its pivot.

In the field of magnetic disk drives, there is a need to provide a high-performance, reliable, and fast servo control system which is economic, compact and robust. Furthermore, to increase the tracking accuracy of the R/W element and thus support higher area density data storage, the servo controller should reject all disturbances such as windage and amplifier noise, without amplifying the measurement noise. Furthermore, movement of the magnetic disk and thus relative movement of the R/W head from the track center needs to be followed accurately. To reject mechanical disturbances and non-mechanical noise, a high bandwidth servo system is normally required.

Typically, two types of narrow bandwidth mechanical disturbances are present in an HDD servo system, both of which contribute to the R/W head deviating off-track. The first type is the repeatable runout (RRO), which is synchronous with rotation of the disk. One approach to cancel the effects of RRO is to modulate the position reference signal such that the actuator output follows one or more components of the runout signal. For example, the paper entitled "Advanced methods for repeatable runout compensation" published by Sacks et al in the IEEE Trans. On Magnetics in March 1995 describes a number of feedforward runout cancellation schemes for HDDs. The paper entitled "Modified Adaptive Feedforward Runout Compensation for Dual-Stage Servo System" by Zhang et al published in the IEEE Trans. On Magnetics in March 2001 presents a dual-stage actuator version of the Adaptive Feedforward Runout Compensation, or AFC, approach. Although such methods of adaptive control can seem very complicated, during implementation of such methods, one can simply record ("calibrate") the necessary control action corresponding to each location of the disk surface and play back the recorded signal to correct the control error due to RRO.

Another approach to deal with RRO is to insert a narrow band filter into the servo loop to increase the servo loop gain at the required frequencies. As a result, the runout signals can be more efficiently rejected. U.S. Pat. No. 6,097,565 granted to Sri-Jayantha et al on Aug. 1, 2000 describes a narrow bandwidth filter to increase the servo loop gains at selected frequencies which are a multiple of the disk spinning speed to increase the attenuation. The patent further proposes a method to initialize the filter so that the transient of the filter is minimal. The prolonged oscillation that is present in servo systems with narrow band filters may thus be alleviated.

The second type of narrow bandwidth mechanical disturbance which can be present in a HDD servo control system, arises due to disk vibration and thus is asynchronous with the disk spinning. This narrow band vibration is not phase locked to the disk rotation and thus, it is called nonrepeatable runout or NRRO. One way to deal with NRRO effects is to eliminate or alleviate disk vibration. This can be attempted by providing a balanced motor and disk pack, improving the damping of the disk, optimising the stiffness or resilience of the disk, and selecting the correct spinning speed. Such optimization of the mechanical system will tend to attenuate disk vibration caused by disk fluttering.

The narrow bandwidth filter approach for RRO compensation appears to work for NRRO because it improves the disturbance rejection at the filter frequency. However, most of the disk fluttering frequencies are in the range of 500 Hz and above, while most servo systems have a bandwidth of a few hundred Hertz to less than 2 kHz. Consequently, the ability to insert a narrow bandwidth filter at a few hundred hertz is limited by the stability of the closed-loop of the servo system. Furthermore, the settling process is very slow when narrow band filters are used in the loop. As a matter of fact, reducing the prolonged settling process was one of the key issues pointed out in Sri-Jayantha's paper. Such an issue is also discussed in a recent paper by R. Ehrlich published in the March 2001 issue of the IEEE Trans. On Magnetics.

Expanding the servo loop gain by using dual-stage servo and using multi-sensing by adding various sensors can help improve the rejection of NRRO both with and without the narrow bandwidth filter.

U.S. Pat. No. 6,064,540 by Huang Fu-Ying et al, IBM, entitled "active control for stabilizing a servo-controller actuator system," filed in March 1998, and granted on May 16, 2000, uses strain sensors to detect the actuator lateral vibration and thus actively control the actuator in-plane vibration. This method can cancel the first two actuator vibration modes and is very effective in providing a robust servo loop, which may allow higher servo bandwidth.

U.S. Pat. No. 5,526,208 granted to M. Hatch of Quantum Corp presents a flex circuit located between a rotary actuator and electronics of a disk drive, for sensing vibration. The apparatus contains a strain gauge attached to or imbedded within the flex circuit. The resistivity of the strain gauge varies in response to vibrations of the flex circuit, which correspond to off-track vibrations of a read/write head supported by the rotary actuator. This resistance variation can be transformed into electrical signals that are used by a servo system to move the actuator assembly in a compensatory manner, in an attempt to cancel any off-track motion of the read/write head caused by the vibrations.

U.S. Pat. No. 5,862,015, granted Jan. 19, 1999 to Evans et at, entitled "Head suspension with resonance feedback transducer", discloses a head suspension assembly including a load beam having a rigid region, a mounting region on a proximal end of the load beam, and a flexure on a distal end of the load beam. Deformation of the head suspension assembly displaces the head attachment region. A strain transducer circuit that acts as a strain gauge is mounted on the head suspension assembly. The resistance of the transducer circuit varies with strain in the circuit, which, in turn, varies with displacement of the read/write head. The magnitude of resistance change of the transducer circuit indicates the magnitude of head off-neutral motion.

The paper entitled "Design and analysis of a high bandwidth disk drive servo system using an instrumented suspension," by Huang Yuhong et al published in the IEEE/ASME Transactions on Mechatronics, Vol 4, No. 2, 1999 uses a strain sensor in the suspension to suppress its in-plan vibration, and thus expand the bandwidth of the closed-loop servo.

Although these sensors assist to expand the servo bandwidth as well as improve the settling performance, the bandwidth improvements are usually up to a few hundred Hertz. The error rejection improvement is thus limited to a few dB.

U.S. Pat. No. 6,181,520 granted to Fukuda of Fujitsu Jan. 30, 2001, entitled "Head slider and disk unit having contact detection means", discloses a suspension, on which the slider is mounted, and an electric resistance pattern formed on the suspension for detecting a strain generated on the resistance pattern when the slider body comes into contact with the disk recording medium. This approach however, does not help improving the tracking accuracy.

With the recent and rapid increases in the number of tracks per inch (TPI) on magnetic data storage media, there exists a need for a simple yet effective mechanical-electronic-control solution to considerably improve the tracking accuracy, and especially to improve disk fluttering induced track misregistrations (TMR).

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to a first aspect, the present invention provides an actuator for supporting a read/write head and for positioning the read/write head adjacent to a magnetic data storage disk, the magnetic data storage disk being rotatable about an axis of the disk and comprising a plurality of substantially concentric data tracks situated about the axis, the actuator comprising:

means for detecting displacement of the actuator in an axial direction relative to the disk, and for producing an output signal for use in a disk flutter control system.

By monitoring movement of the actuator in an axial direction relative to the disk, that is, perpendicular to the disk surface, the present invention provides a manner in which disk flutter may be monitored. As disk flutter causes the read/write head to move, via the air bearing surface (ABS), axial movement of the read/write head and thus the actuator is representative of disk flutter, typically being approximately proportional to disk flutter. Hence, measurement of movement of the actuator in an axial direction relative to the disk enables compensatory control signals to be generated from the output signal of the means for detecting, in order to counteract the effects of disk flutter, and in particular, to counteract disk-utter induced off-track deviation of a read/write head supported by the actuator. For instance, the control signals may have an amplitude which is proportional to an amplitude of the output signal of the means for detecting, and may have a corrected phase relative to a phase of the output signal of the means for detecting. The control signals may then be passed to an actuator drive means in order to counteract deviation of the read/write head caused by the disk flutter.

Accordingly, in a second aspect the present invention provides a magnetic disk drive system comprising:

a magnetic data storage disk being rotatable about an axis of the disk and comprising a plurality of substantially concentric data tracks situated about the axis;

an actuator supporting a read/write head, for positioning the read/write head adjacent to the data tracks of the magnetic data storage disk;

means for detecting displacement of the actuator in an axial direction relative to the disk, and for producing an output signal corresponding to said displacement; and a control system for determining a disk flutter correction drive signal from the output signal of the means for detecting.

It will be appreciated that in embodiments of the second aspect of the invention, the means for detecting displacement of the actuator may be positioned on the actuator. In embodiments of both the first and second aspects of the invention, in order to provide relatively high sensitivity the means for detecting is preferably situated so as to detect movement of a portion of the actuator which is expected to move by a relatively large amount in response to disk flutter. For example, in embodiments where the actuator comprises a head portion for holding a read/write head, the head portion being supported via a suspension by an arm portion, the means for detecting is preferably positioned proximal to the suspension, and even more preferably is positioned on the suspension. As will be appreciated, disk flutter induced movement of the head portion will strain the suspension and cause the suspension to flex. Accordingly, the suspension is an advantageous position for the means for detecting to be located, particularly in embodiments where the means for detecting is a strain sensor. Further, as a data cable from the read/write head typically passes over such a suspension and therefore flexes along with the suspension, the means for detecting may be positioned on or in the data cable.

It will be appreciated that in such embodiments, the arm portion will typically be relatively stiff and inflexible in the axial direction, and so most flexing will occur in the relatively flexible suspension.

Alternatively, the means for detecting may be situated elsewhere on the actuator, such as at a drive portion of the actuator. In such embodiments, movement of the actuator in an axial direction relative to the disk will cause a known corresponding movement of the drive portion. Hence, when such known movement of the drive portion is detected by the means for detecting, it can be determined that the actuator has moved in an axial direction, and thus an appropriate feedforward signal may be derived from the means for detecting in order to counteract the effects of disk flutter, and in particular to counteract off-track deviation of a read/write head supported by the actuator. It will be appreciated that the drive portion may comprise a coil such as a VCM coil, situated at an opposite side of a pivot of the actuator to the read/write head. Alternatively the drive portion may comprise a MEMS actuator driven slider or head, and the means for detecting may comprise an electrostatic or piezo-electric accelerometer mounted on the MEMS actuator driven slider or head.

While the means for detecting may comprise a strain sensor positioned so as to detect flexing of the suspension, it will be appreciated that the means for detecting may alternatively comprise an accelerometer for detecting vibration or movement of the actuator.

The means for detecting may even be situated elsewhere in the magnetic disk drive. For example, the means for detecting may comprise an optical sensor mounted on a casing of the magnetic disk drive and operable to optically detect movement of the actuator in an axial direction.

According to a third aspect, the present invention provides a method of compensating for disk flutter in a hard disk drive system, the method comprising the steps of:

rotating a magnetic data storage disk about an axis of the disk, the disk having a plurality of substantially concentric data tracks situated about the axis of the disk;

positioning a read/write head adjacent to the data tracks of the magnetic data storage disk, the read/write head being supported by an actuator;

detecting displacement of the actuator in an axial direction relative to the disk; and generating a compensatory control signal from said detected displacement, for compensating for effects of disk flutter.

The step of detecting may comprise a direct detection of displacement of the actuator, for example by placement of a strain sensor on the actuator, or by optical monitoring of the actuator. Alternatively, the step of detecting may comprise indirect detection of displacement of the actuator, for example by placement of a strain sensor on a component which is in movable communication with the actuator. As such a component is in movable communication with the actuator, displacement of the actuator will cause a known corresponding movement of the component. Hence, when such known movement of the component is detected in the step of detecting, it can be determined that the actuator has been displaced in an axial direction relative to the disk.

It will be appreciated that the feed forward control configurations for different types of sensor arrangements may be substantially the same, although particular parameters will typically be different. The output of the means for detecting, such as resistance variations or accelerometer outputs, can be transformed into a control signal to be used by a servo system to move the actuator assembly in a compensatory manner, in order to cancel or counteract off-track deviation of the read/write head which may be caused by disk flutter.

The present invention provides a sensor based tracking control method and apparatus that can be easily incorporated with traditional track following controllers. Further, as the external injected signal is advantageously outside the closed-loop servo control, it will not affect the stability of the system. This avoids the difficulties involved in shaping the response of the servo loop at frequencies close to the cross-over frequency. Thus, the requirements on the servo loop bandwidth and consequently the requirements on the actuator, or dual-stage actuator, are less stringent.

It should be appreciated that the term "hard disk drive system" mentioned in the context, such as according to the second and third aspects of the present invention, includes a normal hard disk drive and/or a magnetic hard disk drive in the servo track writing (STW) process.

BRIEF DESCRIPTION OF THE DRAWINGS

Examples of the invention will now be described with reference to the accompanying drawing in which:

FIG. 3b is an enlarged view of a part of FIG. 3a.

DETAILED DESCRIPTION OF THE INVENTION

Figure 1A:
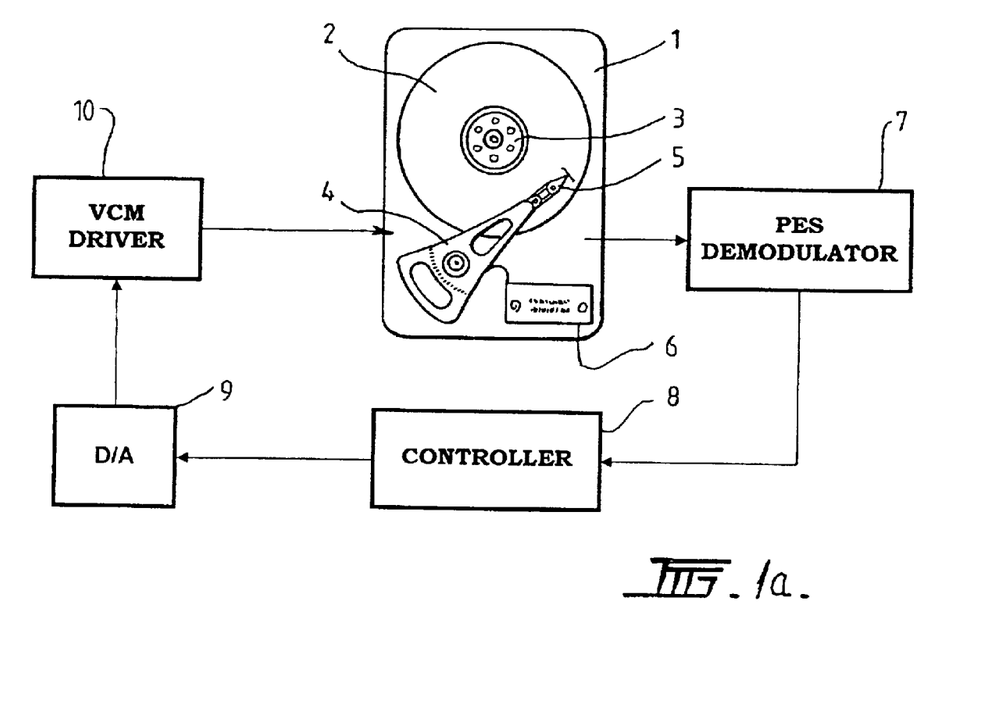
FIG. 1a shows a disk drive actuator servo system.

Referring now to FIG. 1a, there is illustrated a disk drive (1) with a number of rotatable disks (2) which may be turned by a spindle motor (3). A rotary actuator (4) moves a suspension (5) supporting a R/W head, which accesses concentric data tracks on the disk surface. The signal picked up by the R/W head is amplified and filtered. The signal is passed to a circuit (7) that detects the position error signal (PES) and track number. The R/W head can, for example, be a magnetoresistive (MR) head or a giant magnetoresistive (GMR) head, and thus, in such embodiments the PES obtained from the PES demodulator (7) is normally linearized. The linearized PES signal and the track numbers are passed to a servo controller (8) which calculates a required control signal in digital format and outputs the control signal to a voice coil motor (VCM) driving circuit (10) via a digital to analog converter (DAC) (9). Depending on the servo loop bandwidth and access speed requirements, a secondary stage actuator that rides piggyback on the VCM may also be provided. In this case the VCM would provide coarse movement control while the secondary stage actuator would provide fine positioning control. The controller (8) thus may be required to calculate the necessary control signals for both the VCM and the secondary stage actuator.

The controller (8) may be implemented as a digital signal processor (DSP), as one or more micro-controllers, or in the form of a digital infinite impulse response (IIR) filter. The controller (8) should have various correction functions to deal with various disturbances such as windage, disk fluttering, amplifier noise, external vibration, and measurement noise. Normally, the error rejection transfer function (or sensitivity transfer function) and the complementary sensitivity transfer function are carefully selected by the servo designer to ensure adequate disturbance rejection and noise attenuation capabilities.

Figure 1B:
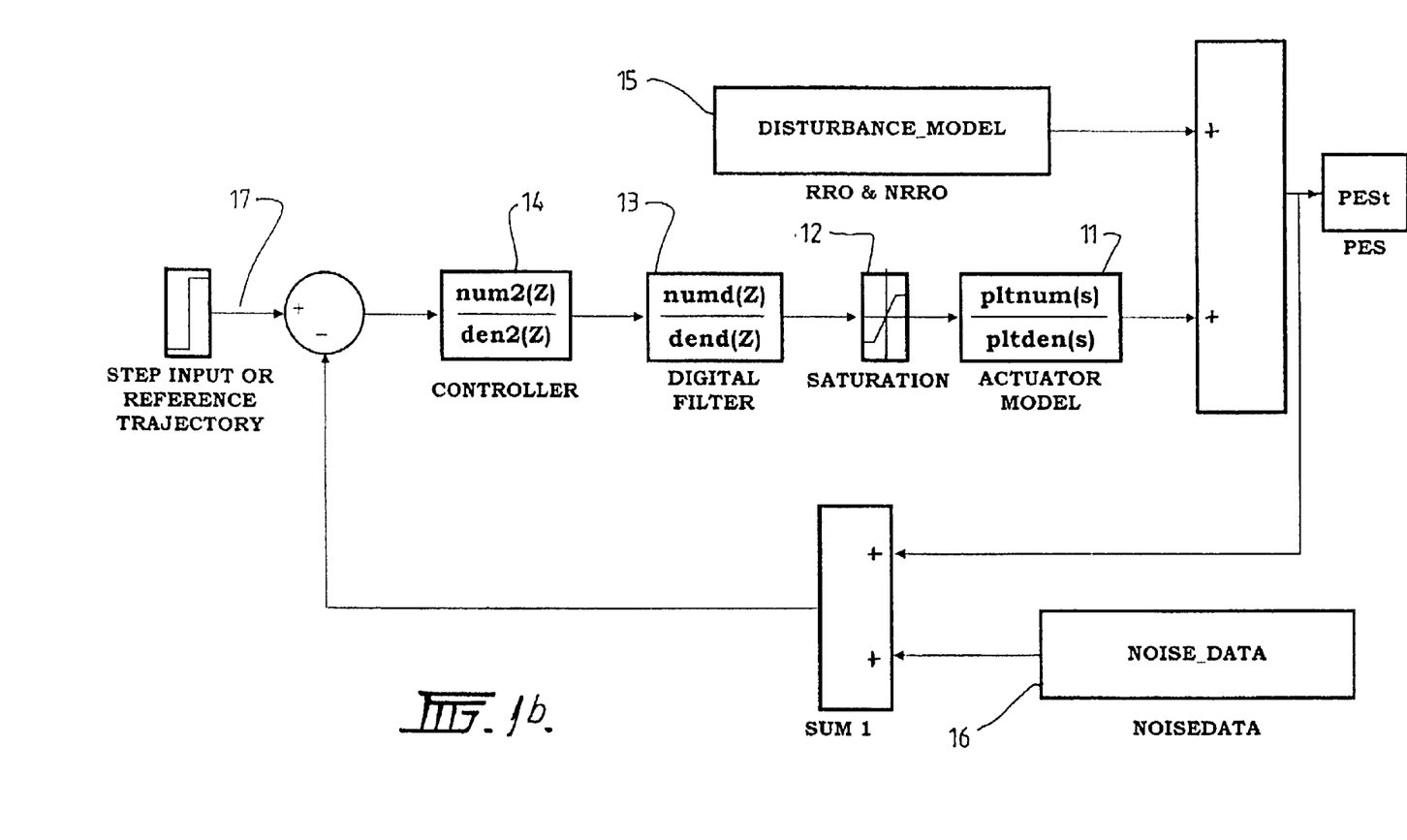
FIG. 1b shows a block diagram of a disk drive actuator servo system.

FIG. 1b is a block diagram of the servo system shown in FIG. 1a. Here the dynamics of the actuator assembly including factors such as the VCM, the arm, the suspension, and the slider are represented as the actuator model (11), which can be represented as a transfer function or as a state space model. For simplicity, the transfer function of the VCM driver (10) is also represented as part of (11) with its saturation represented as another section (12). The various disturbances including the repeatable runout (RRO) and non-repeatable runout (NRRO) in the servo loop can be lumped as a time series (15). The various sources of noise present in the servo loop can be lumped as noise data which is another data series (16). The digital track-following controller has two parts, the filter (13) which deals with the flexible modes of the actuator, and the basic feedback control section (14). In some cases, (14) assumes the form of a proportional-integral-differential (PID) action whereas (13) is a kind of notch filter to suppress the actuator flexible mode.

The reference command (17) could be a step signal of varying amplitude, depending on the numbers of tracks the R/W head is to be moved. Alternatively, the reference signal could be a smoothed version of the step signal, and in most cases, it is precalculated and stored as a look-up table (LUT). In systems where the same RRO components are to be cancelled, the reference signal can have the same predetermined values for the steady state operation for each track, such that the corresponding response of the precalculated values at the actuator output cancels the RRO components.

Figure 2:
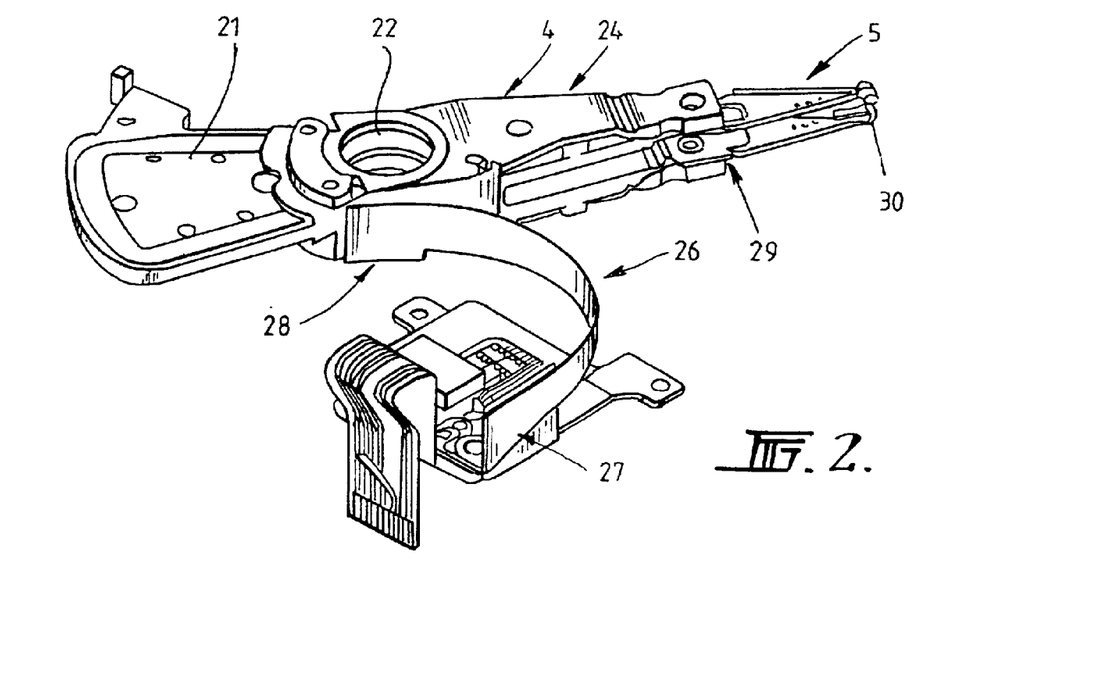
FIG. 2 is a configuration of a HDD head disk assembly.

Referring now to FIG. 2 which illustrates a disk drive actuator with coil (21), pivot bearing (22), arm or E-block (24), and suspension (5). At the tip of the suspension is the read write head (30). A flex cable (26) connects the read write head (30) and the main printed circuit board (PCB) of the HDD which contains most of the electronic circuits and is not shown in FIG. 2. The flex cable could include a R/W amplifier chip located on top of the suspension (e.g., at position (29)). One end of the flex circuit (27) is connected to the main PCB.

The actuator (4) is designed to have high stiffness in the lateral direction and relatively low stiffness in the vertical direction or axial direction relative to the disk. Higher lateral stiffness results in a higher resonant frequency and thus higher servo loop bandwidth. During operation of the disk drive, the read/write head (30) flies slightly above the disk surface due to the action of the air bearing surface (ABS).

Figure 3A:
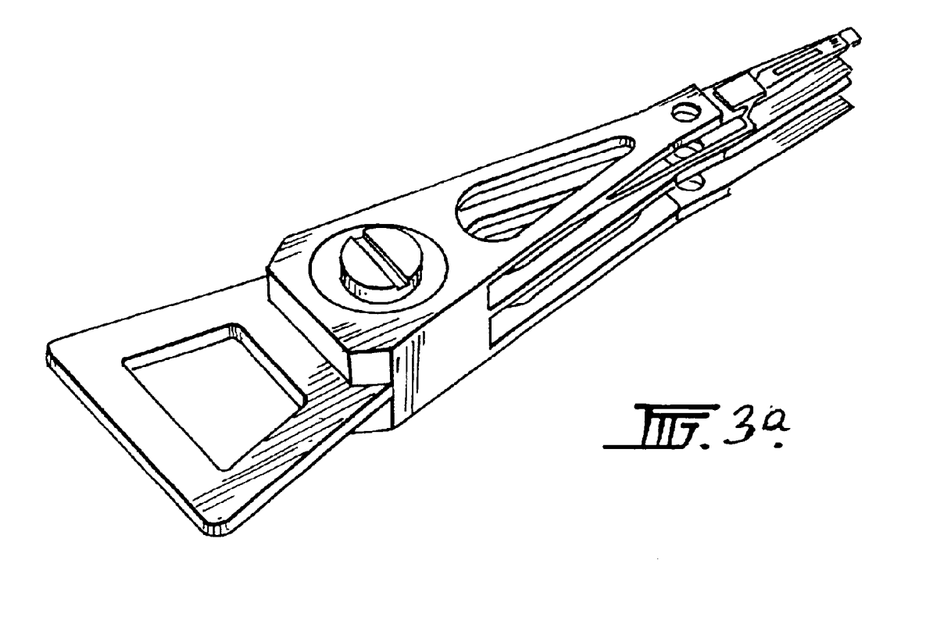
FIG. 3a shows a disk drive actuator with a strain sensor placed on the suspension according to the present invention.
Figure 3B:
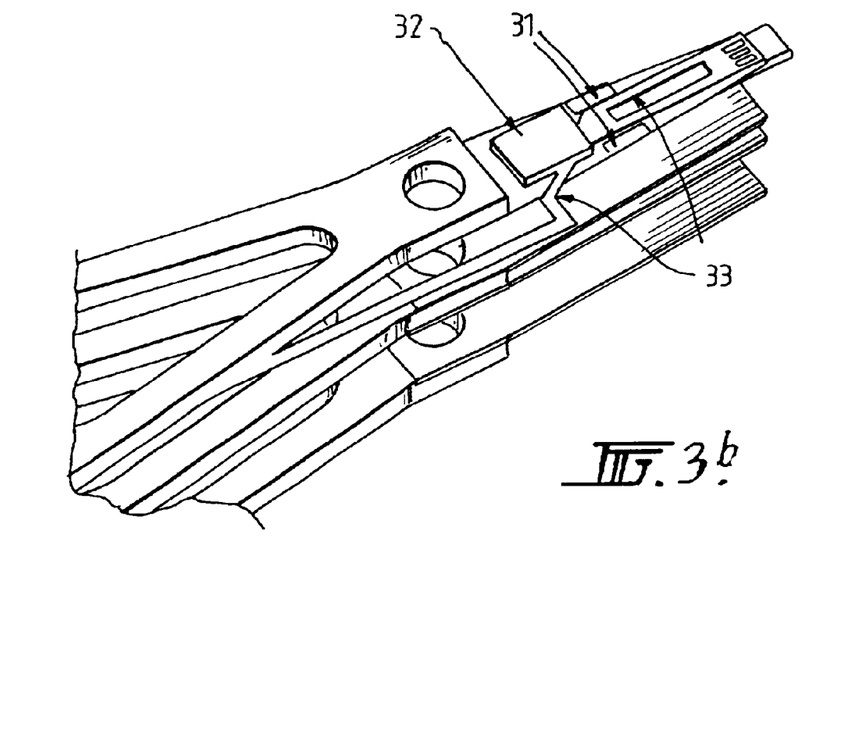

FIG. 3a shows a disk drive actuator with a strain sensor placed on the suspension according to the present invention and FIG. 3b is an enlarged view of part of FIG. 3a. In accordance with one embodiment of the present invention, a strain sensor (31) is formed integral with the suspension 5, or alternatively attached on top of the suspension 5. The output of the strain sensor (31) is connected to the flex cable 26, and passed to the main PCB which amplifies and filters the signal.

Figure 4:
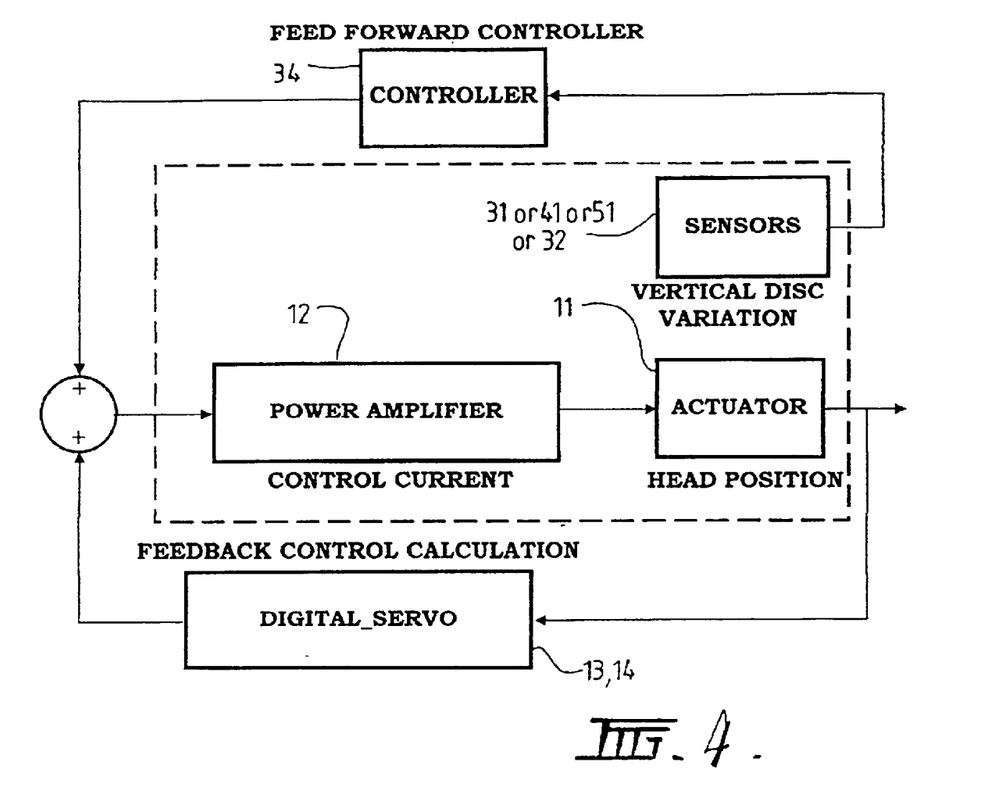
FIG. 4 is the block diagram of the HDD servo system employing the proposed stain sensor.

FIG. 4 shows a modified version of FIG. 1b, accounting for the use of a sensor in accordance with the present invention. According to this figure, and in accordance with the present invention, the strain sensor detects vertical vibration of the disk. The signal from the sensor is passed to the main PCB which, at (34), amplifies and filters the signal, which can be carried out in either analog or digital. The filtered version of the signal is added to a feedback signal from the digital servo control (13 & 14), and passed to the power amplifier (12). The power amplifier drives the actuator, and due to the measurement of vertical or axial displacement of the actuator and the calculation of appropriate correction signals, the head is caused to respond to the movement of disk vibration in addition to other vibration sources.

Figure 5A:
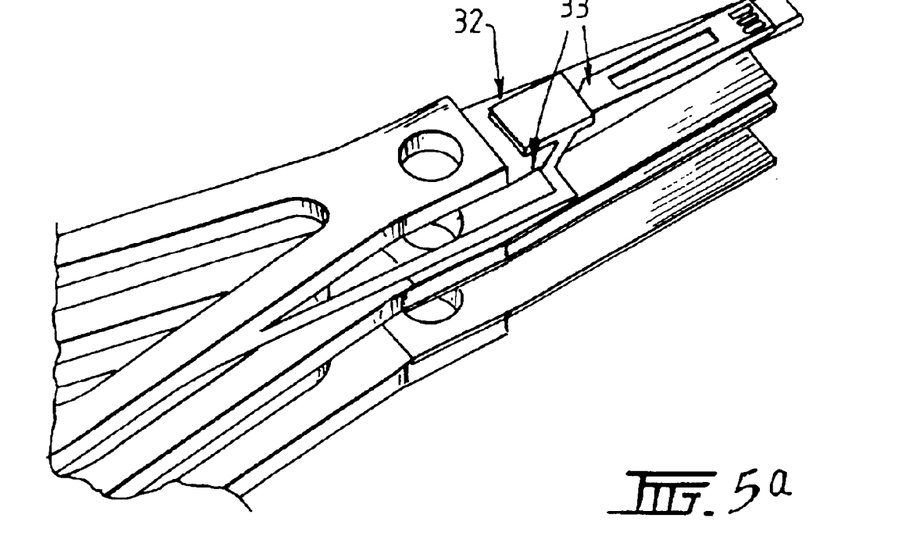
FIG. 5a is yet another two configurations of the proposed method where the sensor is implemented in the flexible cable or the flip chip on the suspension.
Figure 5B:
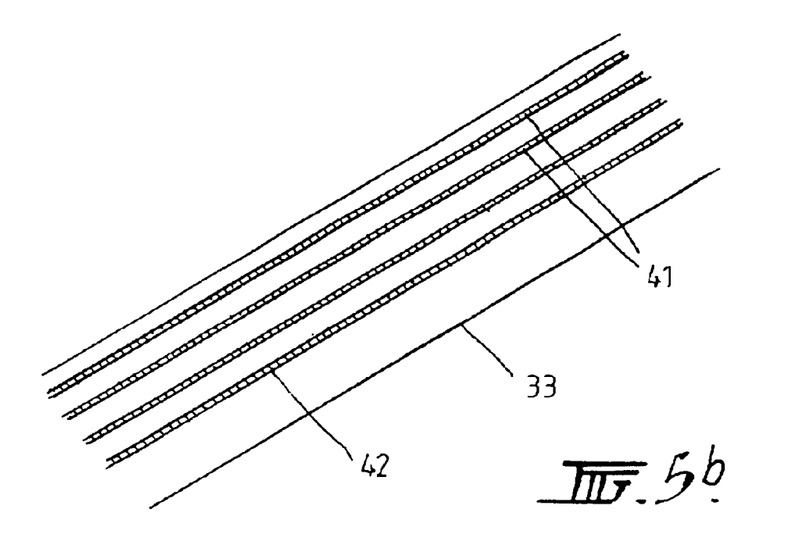
FIG. 5b shows a possible configuration of embedding the strain sensor inside the flex cable.

In an alternative configuration shown in FIG. 5a, a strain sensor is integrated in the flex cable (33) and attached firmly to the suspension. The sensor detects displacement of the suspension in the axial direction, that is, the vertical bending or flexing of the suspension. FIG. 5b shows one possible configuration where, inside the flex cable (33) the strain sensor (41) is printed alongside the usual printed circuits. Alternatively, a strain sensor can be buried inside the flex cable.

In yet another alternative configuration as shown in FIG. 5a, an accelerometer is integrated in the flip chip (32) on the flex cable. The accelerometer could be a piezo-electric, electrostatic, MEMS, or other type of accelerometer. The accelerometer detects the vertical or axial vibration of the suspension, and the signal output by the accelerometer is amplified and passed back to the main PCB for use by the control circuit.

Figure 6:
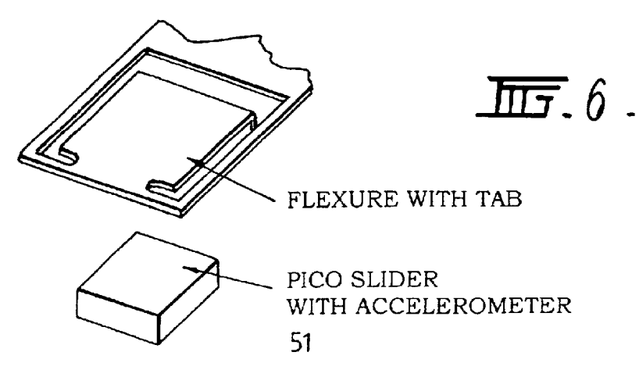
FIG. 6 shows an alternative configuration where an accelerometer is embedded inside the slider.

In yet another alternative to the above configuration, an accelerometer is integrated in a slider, as shown in FIG. 6. The accelerometer could be piezo-electric, electrostatic, MEMS or other type of accelerometer. The accelerometer detects the axial and in-plane vibration of the suspension of the slider, and the signal is amplified and passed back to the main PCB for use by the control circuit.

The control system configuration when the accelerometers are used can be the same as the case when a strain sensor is used. One needs only change the respective gain and amplitudes of various frequencies to correct the R/W head off-track deviation due to disk flutter.

It is to be understood that this disclosure is illustrative only, and changes may be made in detail, especially in matters of structure, arrangement, and parameters of sensors and controller/filter used without departing from the scope and spirit of the present invention.

It is also to be understood that the technique in this disclosure is not limited to the applications in hard disk drives, but is also applicable to disk drive servo track writing (STW) process. As shown in FIG. 1a, during this process, the media or disks (2), the spindle motor (3), can be in final assembled format with the disk drive (1). The actuator (4) and the suspension (5) may be an external design specifically for the STW process according to the invention. It may also be the normal HDD actuator (4) and suspension using the present invention. The disk vertical vibration is monitored using the method disclosed above.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An actuator assembly comprising:
    an actuator for supporting a read/write head and for positioning the read/write head adjacent to a magnetic data storage disk, the magnetic data storage disk being rotatable about an axis of the disk and comprising a plurality of substantially concentric data tracks situated about the axis;
    means for detecting displacement of the actuator in an axial direction relative to the disk;
    means for producing an output signal associated with the displacement of the actuator for use in a disk flutter control system; and
    means for moving the actuator in a radial direction based at least in part on the output signal.

2. An actuator assembly according to claim 1, wherein the actuator comprises a head portion for holding a read/write head, the head portion being supported via a suspension by an arm portion, and wherein the means for detecting is positioned proximal to the suspension and detects axial movement of the suspension.

3. An actuator assembly according to claim 2, wherein the actuator is formed integrally with the suspension.

4. An actuator assembly according to claim 2, wherein the actuator is mounted on the suspension.

5. An actuator assembly according to claim 2, wherein the means for detecting is a strain sensor.

6. A magnetic disk drive system comprising:
- a magnetic data storage disk rotatable about an axis of the disk and comprising a plurality of substantially concentric data tracks situated about the axis;
- an actuator supporting a read/write head, for positioning the read/write head adjacent to the data tracks of the magnetic data storage disk;
- means for detecting displacement of the actuator in an axial direction relative to the disk, and for producing an output signal corresponding to said displacement;
- a control system for generating a compensatory control signal from the output signal of the means for detecting, for counteracting effects of disk flutter; and
- means for moving the actuator in a radial direction based at least in part on the compensatory control signal.

7. A magnetic disk drive system as claimed in claim 6, wherein the compensatory control signal is proportional in amplitude to the output signal of the means for detecting, and is phase corrected relative to the output signal of the means for detecting.

8. A magnetic disk drive system as claimed in claim 6, wherein the compensatory control signals are passed to an actuator drive means in order to counteract movement of the read/write head caused by the disk flutter.

9. A magnetic disk drive-system as claimed in claim 6, wherein the means for detecting is positioned on the actuator.

10. A magnetic disk drive system according to claim 6, wherein the actuator comprises a head portion for holding a read/write head, the head portion being supported via a suspension by an arm portion, and wherein the means for detecting is positioned proximal to the suspension and detects axial movement of the suspension.

11. A magnetic disk drive system according to claim 10, wherein the actuator is formed integrally with the suspension.

12. A magnetic disk drive system according to claim 10, wherein the actuator is mounted on the suspension.

13. A magnetic disk drive system according to claim 10, wherein the means for detecting is a strain sensor.

14. A magnetic disk drive system comprising:
- a magnetic data storage disk rotatable about an axis of the disk and a plurality of substantially concentric data tracks situated about the axis;
- an actuator supporting a read/write head, for positioning the read/write head adjacent to the data tracks of the magnetic data storage disk;
- means for detecting displacement of the actuator in an axial direction relative to the disk, and for producing an output signal corresponding to said displacement; and
- a control system for generating a compensatory control signal from the output signal of the means for detecting, for counteracting effects of disk flutter, wherein the actuator includes a head portion for holding a read/write head, the head portion being supported via a suspension by an arm portion, and wherein the means for detecting is positioned proximal to the suspension and detects axial movement of the suspension, wherein a data cable from the head portion passes over the suspension, and wherein the means for detecting is positioned on or in the data cable.

15. A magnetic disk drive system according to claim 6, wherein the means for detecting is situated proximal to a drive portion of the actuator, and detects movement of the drive portion.

16. A magnetic disk drive system as claimed in claim 6, wherein the means for detecting comprises an accelerometer for detecting vibration or movement of the actuator in an axial direction relative to the disk.

17. A magnetic disk drive system comprising:
- a magnetic data storage disk rotatable about an axis of the disk and comprising a plurality of substantially concentric data tracks situated about the axis;
- an actuator supporting a read/write head, for positioning the read/write head adjacent to the data tracks of the magnetic data storage disk;
- means for detecting displacement of the actuator in an axial direction relative to the disk, and for producing an output signal corresponding to said displacement; and
- a control system for generating a compensatory control signal from the output signal of the means for detecting, for counteracting effects of disk flutter, wherein the means for detecting comprises an optical sensor mounted on a casing of the magnetic disk drive, operable to optically detect movement of the actuator in an axial direction.

18. A method of compensating for disk flutter in a hard disk drive system, the method comprising the steps of:
- rotating a magnetic data storage disk about an axis of the disk, the disk having a plurality of substantially concentric data tracks situated about the axis of the disk;
- positioning a read/write head adjacent to the data tracks of the magnetic data storage disk, the read/write head being supported by an actuator;
- detecting displacement of the actuator in an axial direction relative to the disk;
- generating a compensatory control signal from said detected displacement, for compensating for effects of disk flutter; and
- moving the actuator in a radial direction based at least in part on the compensatory control signal.

19. The method of claim 18 wherein the step of detecting comprises directly detecting axial displacement of the actuator.

20. The method of claim 18 wherein the step of detecting comprises indirectly detecting axial displacement of the actuator, by detecting movement of a component which is in movable communication with the actuator.

* * * * *